(12) United States Patent
Liu (10) Patent No.: US 11,077,013 B2
(45) Date of Patent: Aug. 3, 2021

(54) STIMULATING MECHANISM FOR ADULT TOY

(71) Applicant: DANXIAO INFORMATION TECHNOLOGY LTD., Guangzhou (CN)

(72) Inventor: Dan Liu, Guangdong (CN)

(73) Assignee: Dangxiao Information Technology LTD., Guangzhou (CN)

( * ) Notice: Subject to any disclaimer, the term of this patent is extended or adjusted under 35 U.S.C. 154(b) by 223 days.

(21) Appl. No.: 16/566,858

(22) Filed: Sep. 10, 2019

(65) Prior Publication Data

US 2021/0196559 A1 Jul. 1, 2021

(51) Int. Cl.
| | |
|---|---|
| *A61H 19/00* | (2006.01) |
| *H02K 7/116* | (2006.01) |
| *H02K 41/02* | (2006.01) |
| *A61H 9/00* | (2006.01) |
| *H01F 7/02* | (2006.01) |

(52) U.S. Cl.
CPC ........... *A61H 19/32* (2013.01); *A61H 9/0057* (2013.01); *H01F 7/02* (2013.01); *H02K 7/1166* (2013.01); *H02K 41/02* (2013.01); *A61H 2201/1215* (2013.01); *A61H 2201/1664* (2013.01); *A61H 2201/5007* (2013.01)

(58) Field of Classification Search
CPC ........ A61H 19/00; A61H 19/30; A61H 19/32; A61H 19/34; A61H 19/40; A61H 19/44; A61H 19/50; A61H 21/00; A61H 23/00; A61H 23/02; A61H 23/0218
See application file for complete search history.

(56) References Cited

U.S. PATENT DOCUMENTS

| | | | |
|---|---|---|---|
| 9,610,214 B2 | 4/2017 | Zipper | |
| 2006/0264700 A1 | 11/2006 | Guy | |
| 2009/0275796 A1 | 11/2009 | Gil | |
| 2013/0281776 A1* | 10/2013 | Levy | .......................... A61F 5/41 600/38 |
| 2015/0328082 A1 | 11/2015 | Jiang et al. | |
| 2017/0087049 A1 | 3/2017 | Hutchinson | |
| 2018/0031090 A1* | 2/2018 | Wong | ................... A61H 23/004 |
| 2020/0214932 A1* | 7/2020 | Pahl | ..................... A61H 9/0007 |

* cited by examiner

*Primary Examiner* — John P Lacyk (74) *Attorney, Agent, or Firm* — Kanika Radhakrishnan; Evergreen Valley Law Group (57) ABSTRACT

A stimulating mechanism for an adult toy is disclosed. The stimulating mechanism includes a first elongate cavity having a first end and a second end. The stimulating mechanism also includes a first magnet having a north pole side and a south pole side, and arranged inside the first elongate cavity. The stimulating mechanism further includes a second magnet having a north pole side and a south pole side, and arranged with respect to the first magnet. Herein, the second magnet is caused to recurrently change the magnetic orientation with respect to the first magnet such that the north pole side and the south pole side of the second magnet are alternatively facing one of the north pole side and the south pole side of the first magnet, causing the first magnet to linearly translate inside the first elongate cavity.

20 Claims, 6 Drawing Sheets

STIMULATING MECHANISM FOR ADULT TOY

TECHNICAL FIELD

The present disclosure generally relates to adult toys, also known as sex toys, and particularly relates to a stimulating mechanism for an adult toy to provide sucking stimulus to a user.

BACKGROUND

An adult toy (or sex toy) is an object or device that is primarily used to facilitate human sexual pleasure and typically are designed to resemble human genitals and may be vibrating or non-vibrating. Adult toys, such as vibrating toys (like vibrators) are commonly available in the adult toy market. These types of adult toys are widely used to provide users with sexual stimulation. However, it has been observed that as time goes on, users get bored with an adult toy which only has vibrating functionality. To mitigate this, adult toys with new functionality such as sucking are more and more welcomed by users. These adult toys of the kind of male masturbators have been known for a long time. Sucking stimulation may bring users a new sense of excitement.

These types of adult toys recreate an effect similar to the fellatio, commonly known as "blow job simulators". The fellatio reproduces the penetration movement with the difference that it also stimulates the male sexual organ thanks to the pressure of the lips on the penis. This effect is recreated by the elastic elements located on the open extremity of the male masturbators. One of the most common types consists of a rigid cylindrical container in which the male sexual organ is inserted. Said rigid container is hollow and equipped with pneumatic systems changing the internal pressure and therefore increasing the pressure on the male organ and ensuring pleasure with a delicate aspiration. That said, the known mechanisms for providing such effect have generally been very complicated and not been very reliable.

It is desirable to develop a mechanism for an adult toy which can provide sucking stimulation with reliability.

SUMMARY OF THE EMBODIMENTS

Various aspects and embodiments of the present disclosure provide a stimulating mechanism for an adult toy which can provide sucking stimuli to a user, for example, to recreate on the male sexual organ an effect similar to the fellatio.

According to an embodiment of the present disclosure, a stimulating mechanism for an adult toy is provided. The stimulating mechanism includes a first elongate cavity having a first end and a second end. The stimulating mechanism also includes a first magnet having a north pole side and a south pole side, the first magnet arranged inside the first elongate cavity to linearly translate between the first end and the second end thereof. The stimulating mechanism further includes a second magnet having a north pole side and a south pole side, the second magnet arranged with respect to the first magnet to face one of the north pole side and the south pole side of the first magnet. Herein, the second magnet is caused to recurrently change the magnetic orientation with respect to the first magnet such that the north pole side and the south pole side of the second magnet are alternatively facing one of the north pole side and the south pole side of the first magnet, causing the first magnet to linearly translate inside the first elongate cavity.

In one or more embodiments, the stimulating mechanism further includes a second elongate cavity having a first end and a second end, the first end of the second elongate cavity is coupled to the second end of the first elongate cavity to be disposed in fluid communication therewith, and the second end of the second elongate cavity being open-ended, such that the second elongate cavity is disposed in an expiratory state when the first magnet linearly translates to move from the first end to the second end inside of the first elongate cavity and the second elongate cavity is disposed in an inspiratory state when the first magnet linearly translates to move from the second end to the first end inside of the first elongate cavity.

In one embodiment, the first magnet and the second magnet are permanent magnets. Herein, the stimulating mechanism includes a motor coupled to the second magnet via a gear arrangement, wherein the motor, via the gear arrangement, is configured to rotate the second magnet to recurrently change the magnetic orientation thereof with respect to the first magnet. Further, the gear arrangement comprises a shaft, with screw threads, rotatably coupled to the motor, and a gear wheel with teeth engaged with the screw threads of the shaft, and having a rotating element fixed and extending along central axis thereof to which the second magnet is mounted. The stimulating mechanism may also include a motor controller configured to regulate a rate of rotation of the motor, and thereby a rate of rotation of the second magnet, to correspondingly vary a rate of linearly translation of the first magnet inside the first elongate cavity.

In another embodiment, the first magnet is a permanent magnet and the second magnet is an electromagnet. Herein, the stimulating mechanism includes an electrical line configured to supply electric current to the second magnet; and an electric supply controller configured to recurrently reverse direction of the supply of the electric current to the second magnet to cause switching of the north pole side and the south pole side therein, and thereby recurrently change the magnetic orientation of the second magnet with respect to the first magnet.

In one or more embodiments, the stimulating mechanism further includes a bracket to support the motor therein; and a shell defining at least the first elongate cavity.

In one or more embodiments, the stimulating mechanism further includes a housing adapted to cover, at least, the bracket and the shell therein.

According to another embodiment of the present disclosure, a stimulating mechanism for an adult toy is provided. The stimulating mechanism includes a first elongate cavity having a first end and a second end. The stimulating mechanism also includes a first magnet being a permanent magnet and having a north pole side and a south pole side, the first magnet arranged inside the first elongate cavity to linearly translate between the first end and the second end thereof. The stimulating mechanism further includes a second magnet being a permanent magnet and having a north pole side and a south pole side, the second magnet arranged with respect to the first magnet to face one of the north pole side and the south pole side of the first magnet. The stimulating mechanism further includes a motor coupled to the second magnet via a gear arrangement, wherein the motor, via the gear arrangement, is configured to rotate the second magnet to recurrently change the magnetic orientation thereof with respect to the first magnet such that the north pole side and the south pole side of the second magnet are alternatively facing one of the north pole side and the south pole side of the first magnet, causing the first magnet to linearly translate inside the first elongate cavity.

In one or more embodiments, the stimulating mechanism further includes a second elongate cavity having a first end and a second end, the first end of the second elongate cavity is coupled to the second end of the first elongate cavity to be disposed in fluid communication therewith, and the second end of the second elongate cavity being open-ended, such that the second elongate cavity is disposed in an expiratory state when the first magnet linearly translates to move from the first end to the second end inside of the first elongate cavity and the second elongate cavity is disposed in an inspiratory state when the first magnet linearly translates to move from the second end to the first end inside of the first elongate cavity.

In one or more embodiments, the gear arrangement comprises a shaft, with screw threads, rotatably coupled to the motor, and a gear wheel with teeth engaged with the screw threads of the shaft, and having a rotating element fixed and extending along central axis thereof to which the second magnet is mounted.

In one or more embodiments, the stimulating mechanism further includes a motor controller configured to regulate a rate of rotation of the motor, and thereby a rate of rotation of the second magnet, to correspondingly vary a rate of linearly translation of the first magnet inside the first elongate cavity.

In one or more embodiments, the stimulating mechanism further includes a bracket to support the motor therein; and a shell defining at least the first elongate cavity.

In one or more embodiments, the stimulating mechanism further includes a housing adapted to cover, at least, the bracket and the shell therein.

According to yet another embodiment of the present disclosure, a stimulating mechanism for an adult toy is provided. The stimulating mechanism includes a first elongate cavity having a first end and a second end. The stimulating mechanism also includes a first magnet being a permanent magnet and having a north pole side and a south pole side, the first magnet arranged inside the first elongate cavity to linearly translate between the first end and the second end thereof. The stimulating mechanism further includes a second magnet being an electromagnet and having a north pole side and a south pole side, the second magnet arranged with respect to the first magnet to face one of the north pole side and the south pole side of the first magnet. The stimulating mechanism further includes an electrical line configured to supply electric current to the second magnet. The stimulating mechanism further includes an electric supply controller configured to recurrently reverse direction of the supply of the electric current to the second magnet to cause switching of the north pole side and the south pole side therein, and thereby recurrently change the magnetic orientation of the second magnet with respect to the first magnet, causing the first magnet to linearly translate inside the first elongate cavity.

In one or more embodiments, the stimulating mechanism further includes a second elongate cavity having a first end and a second end, the first end of the second elongate cavity is coupled to the second end of the first elongate cavity to be disposed in fluid communication therewith, and the second end of the second elongate cavity being open-ended, such that the second elongate cavity is disposed in an expiratory state when the first magnet linearly translates to move from the first end to the second end inside of the first elongate cavity and the second elongate cavity is disposed in an inspiratory state when the first magnet linearly translates to move from the second end to the first end inside of the first elongate cavity.

In one or more embodiments, the electric supply controller is further configured to regulate a rate of reversal of direction of the supply of the electric current to the second magnet to correspondingly vary a rate of linearly translation of the first magnet inside the first elongate cavity.

In one or more embodiments, the stimulating mechanism further includes a shell defining at least the first elongate cavity therein, and a housing adapted to cover the shell.

Other aspects and example embodiments are provided in the drawings and the detailed description that follows.

BRIEF DESCRIPTION OF DRAWINGS

For a more complete understanding of example embodiments of the present technology, reference is now made to the following descriptions taken in connection with the accompanying drawings in which.

The drawings referred to in this description are only exemplary in nature and shall not be construed as limiting the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure can be practiced with details other than these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It is to be appreciated that determinations or inferences referenced throughout the present disclosure can be practiced through the use of computing techniques. In this regard, some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Figure 1:
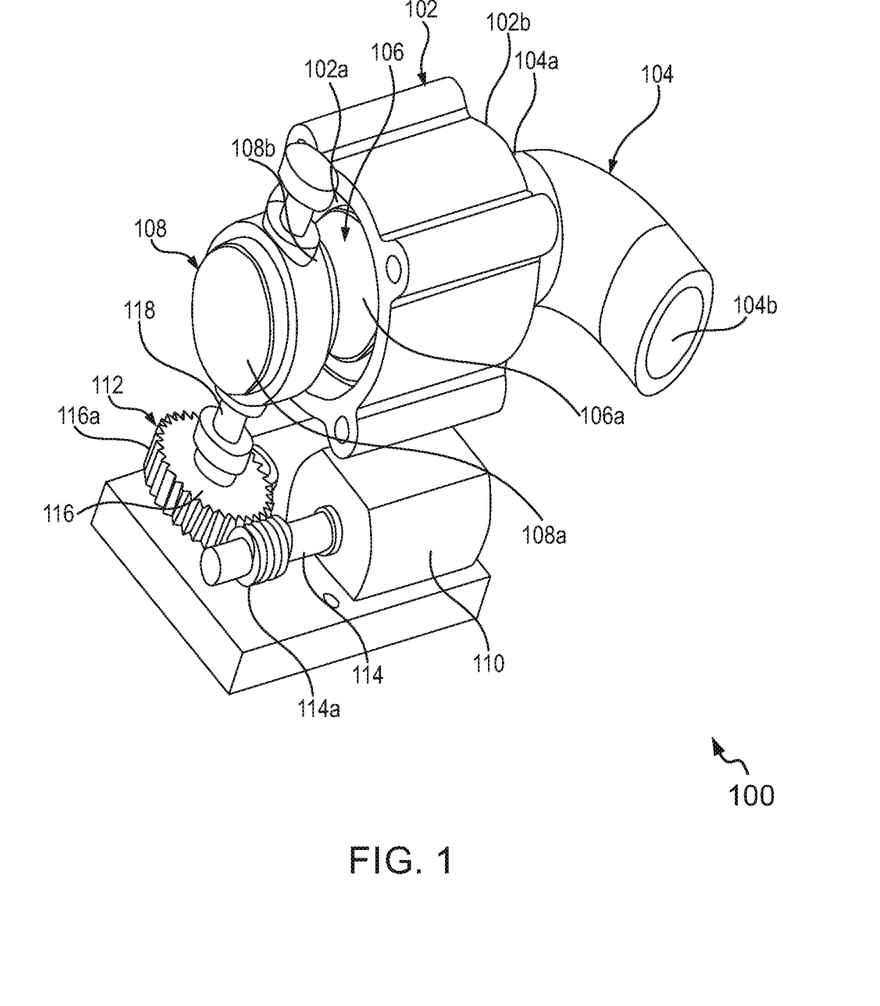
FIG. 1 illustrates a diagrammatic perspective view of a stimulating mechanism for an adult toy, in accordance with a first embodiment of the present disclosure.

Referring to FIG. 1, illustrated is diagrammatic view of a stimulating mechanism (generally referred by the numeral 100), in accordance with a first embodiment of the present disclosure. The stimulating mechanism 100 of the present disclosure is designed to be implemented in an adult toy (not shown). In general, the stimulating mechanism 100 of the present disclosure can be embodied as the adult toy without departing from the scope of the present disclosure, and the two terms have been interchangeably used herein. The adult toy can come in a variety of configurations and perform a variety of functions, ranging from medical therapy to erotic stimulation. The adult toy can provide different types of stimulations, such as vibrational stimulation, motion stimulation, force stimulation, electric stimulation, friction stimulation, and/or other types of stimulation to a user. In some examples, the adult toy can provide a sensory feedback to a user to indicate the real time strength, pattern, and other status information of the stimulations. The sensory feedback can be audio feedback and/or haptic feedback to the user. In the present embodiments, the adult toy is utilized to provide sucking stimuli to a user, for example, to recreate on the male sexual organ an effect similar to the fellatio. It would be appreciated by a person skilled in the art that the stimulating mechanism 100 would be positioned internally of the adult toy and may provide the necessary sucking action.

As illustrated in FIG. 1, the stimulating mechanism 100 includes a first elongate cavity 102. Herein, the first elongate cavity 102 is an air compression cavity, and the two terms have been interchangeably used without any limitations. As may be seen, the first elongate cavity 102 is generally in the form of a tubular structure. The first elongate cavity 102 has a first end 102a and a second end 102b. Further, the stimulating mechanism 100 further includes a second elongate cavity 104. Herein, the second elongate cavity 104 is a breath cavity, and the two terms have been interchangeably used without any limitations. Again, as may be seen, the first elongate cavity 102 is generally in the form of a tubular structure. The second elongate cavity 104 has a first end 104a and a second end 104b. In the present configuration, the second end 104b of the second elongate cavity 104 is open-ended. Further, the first end 104a of the second elongate cavity 104 is coupled to the second end 102b of the first elongate cavity 102 to be dispose the first elongate cavity 102 and the second elongate cavity 104 in fluid communication with each other. In other words, the first elongate cavity 102 and the second elongate cavity 104 are communicant with each other to allow for air to move from the first elongate cavity 102 to the second elongate cavity 104 and vice versa. Although, the present configuration has been described in terms of the first elongate cavity 102 and the second elongate cavity 104 being two separate bodies; it may be appreciated by a person skilled in the art that in some examples, the first elongate cavity 102 and the second elongate cavity 104 may be integrated and provide a singular tubular structure without departing from the spirit and scope of the present disclosure in any manner.

Also, as illustrated in FIG. 1, the stimulating mechanism 100 also includes a first magnet 106. The first magnet 106 has a north pole side 106a and a south pole side (not visible in the accompanying drawings). As shown, the first magnet 106 is arranged inside the first elongate cavity 102 to linearly translate between the first end 102a and the second end 102b thereof. In the present first embodiment, the first magnet 106 is a permanent magnet. The stimulating mechanism 100 further includes a second magnet 108. The second magnet 108 has a north pole side 108a and a south pole side 108b. Herein, the second magnet 108 is arranged with respect to the first magnet 106 to face one of the north pole side 106a and the south pole side of the first magnet 106. In the illustrated example, as shown, the second magnet 108 is arranged to face the north pole side 106a of the first magnet 106. In the present first embodiment, similar to the first magnet 106, the second magnet 108 is also a permanent magnet.

Further, as illustrated in FIG. 1, the stimulating mechanism 100 provides an arrangement to support the second magnet 108 in relation to the first magnet 106, as described above. The stimulating mechanism 100 includes a motor 110 coupled to the second magnet 108. In the present first embodiment, the motor 110 may be any one of AC motor or DC motor as known in the art. Preferably, the motor 110 is a DC motor as widely available in the market. It may be appreciated that the stimulating mechanism 100 may further include a power source (not shown) to provide electric power for operation of the motor 110. For instance, to make the adult toy in which the present stimulating mechanism 100 is implemented portable, the utilized power source may be a battery, and the motor may be chosen to be of a configuration to be operable by the utilized battery.

As illustrated, the stimulating mechanism 100 further includes a gear arrangement 112. As may be seen, the motor 110 is coupled to the second magnet 108 via the gear arrangement 112. The gear arrangement 112 includes a shaft 114 and a gear wheel 116. The shaft 114 is provided with screw threads 114a and the gear wheel 116 is provided with teeth 116a. As shown, the shaft 114 is rotatably coupled to the motor 110, such that when the motor 110 is operated to provide rotational movement, the shaft 114 rotates therewith. Also, as shown, the teeth 116a of the gear wheel 116 are engaged with the screw threads 114a of the shaft 114. Further, a rotating element 118 is fixed and extends along central axis of the gear wheel 116. The second magnet 108 is mounted on the rotating element 118. Therefore, it may be contemplated that with the operation of the motor 110, the shaft 114 rotates, which in turn rotates the gear wheel 116, along with which the rotating element 118 rotates, and thereby the second magnet 108 mounted thereon.

In the present configuration, the shaft 114 (and the corresponding screw threads 114a) is disposed in horizontal placement while the gear wheel 116 (and the corresponding teeth 116a) is disposed in vertical placement. When the motor 110 is operated, the shaft 114 will make the screw threads 114a rotate based on a horizontal axis, and those horizontal rotating screw threads 114a drive the teeth 116a of the gear wheel 116 to rotate based on a vertical axis. When the gear wheel 116 is driven to rotate (by the horizontal rotating screw threads 114a) about the vertical axis, the rotating element 118 also rotates about the same vertical axis as the gear wheel 116. Thereby, it may be understood that the second magnet 108 is rotatable and can rotate about the vertical axis. Also, as discussed above, the first magnet 106 is moveable and can move horizontally in the first elongated cavity 102. It may be appreciated that the given configuration is exemplary only and shall not be construed as limiting to the present disclosure.

As discussed in the preceding paragraph, the motor 110 is configured to rotate the second magnet 108 via the gear arrangement 112. It may be understood that the second magnet 108 is rotated on central (vertical) axis of the rotating element 118. This recurrently changes the magnetic orientation of the second magnet 108 with respect to the first magnet 106. In other words, the second magnet 108 recurrently (or repeatedly) switches the magnetic side, i.e. one of the north pole side 108a and the south pole side 108b thereof, facing the north pole side 106a of the first magnet 106. Therefore, when the second magnet 108 is caused to recurrently change its magnetic orientation with respect to the first magnet 106, the north pole side 108a and the south pole side 108b of the second magnet 108 are alternatively facing the north pole side 106a (in the present illustrated example) of the first magnet 106. It is very well known that like magnetic poles repel each other and unlike magnetic poles attract each other. Therefore, when the north pole side 108a of the second magnet 108 is facing the north pole side 106a of the first magnet 106, the two magnets 106 and 108 repel each other; and on the other hand, when the south pole side 108b of the second magnet 108 is facing the north pole side 106a of the first magnet 106, the two magnets 106 and 108 attract each other. Since the second magnet 108 (rotatable magnet) is fixedly mounted on the rotating element 118, it cannot move; and since the first magnet 106 (movable magnet) is arranged inside the first elongate cavity to linearly translate between the first end and the second end thereof, it can move. With the repeated repelling (pushing) and attracting (pulling) force on the first magnet 106 due to the rotation of the second magnet 108, the first magnet 106 is caused to linearly translate inside the first elongate cavity 102.

Now, as may be appreciated, as the first magnet 106 may move inside the first elongate cavity 102 from the first end 102a to the second end 102b, it compresses the air present in the first elongated cavity 102. Since the first elongated cavity 102 (air compression cavity) and the second elongated cavity 104 (breath cavity) are communicant with each other, this results in the compressed air from the first elongated cavity 102 to move to the second elongated cavity 104. The result is the second elongated cavity 104 being in the expiratory state. Further, as the first magnet 106 may move inside the first elongate cavity 102 from the second end 102b to the first end 102a, it creates a vacuum inside the first elongate cavity 102. Since the first elongated cavity 102 and the second elongated cavity 104 are communicant with each other, this result in moving (sucking) of the air from the second elongated cavity 104 to the first elongated cavity 102. The result is the second elongated cavity 104 being in the inspiratory state.

In other words, the rotatable permanent magnet 108 and the movable permanent magnet 106 may repel each other by a horizontal repelling force. Such repelling force will force the rotatable permanent magnet 108 and the movable permanent magnet 106 move far away from each other in a horizontal direction. For the reason that the rotatable permanent magnet 108 can just rotate about the vertical axis, only the moveable permanent magnet 106 can move in the horizontal direction. So the repelling force will make the moveable permanent magnet 106 move from the first end 102a of the air compression cavity 102 to the second end 102b of the air compression cavity 102. The movable permanent magnet 106 will compress the air in the air compression cavity 102, while the air compression cavity 102 and the breath cavity 104 are communicant with each other, this means that air will move from the air compression cavity 102 to the breath cavity 104. The result is the breath cavity 104 being in the expiratory state. Further, the rotatable permanent magnet 108 and the movable permanent magnet 106 may attract each other by a horizontal attracting force. Such attracting force will force the rotatable permanent magnet 108 and the movable permanent magnet 106 to move in a horizontal direction. For the reason that the rotatable permanent magnet 108 can just rotate about the vertical axis, only the moveable permanent magnet 106 can move in the horizontal direction. So the attracting force will make the moveable permanent magnet 106 move from the second end 102b of the air compression cavity 102 to the first end 102a of the air compression cavity 102. The movable permanent magnet 106 will generate negative atmospheric pressure in the air compression cavity 102, while the air compression cavity 102 and the breath cavity 104 are communicant with each other which means that the air will move from the breath cavity 104 to the air compression cavity 102. The result is the breath cavity 104 being in the inspiratory state.

In some instances of the first embodiment, the stimulating mechanism 100 may also include a motor controller (not shown). The motor controller is configured to regulate a rate of rotation of the motor 110. It may be appreciated that by regulating the rate of rotation of the motor 110, the motor controller, in turn, may control a rate of rotation of the second magnet 108. And, as discussed above, since the rotation of the second magnet 108 causes the linear movement of the first magnet 106, the motor controller, in turn, correspondingly varies a rate of linearly translation of the first magnet 106 inside the first elongate cavity 102. It may also be appreciated that the by controlling the said rate, the motor controller may also define the extent of movement of the first magnet 106 between the first end 102a and the second end 102b inside the first elongate cavity 102, and thus may control the volume of air displaced therein. Thereby, the motor controller may be able to control a rate and volume of inhalation and expiration of the air from the first elongate cavity 102, and thereby define the sucking characteristics of the stimulating mechanism 100 for the adult toy.

Figure 2:
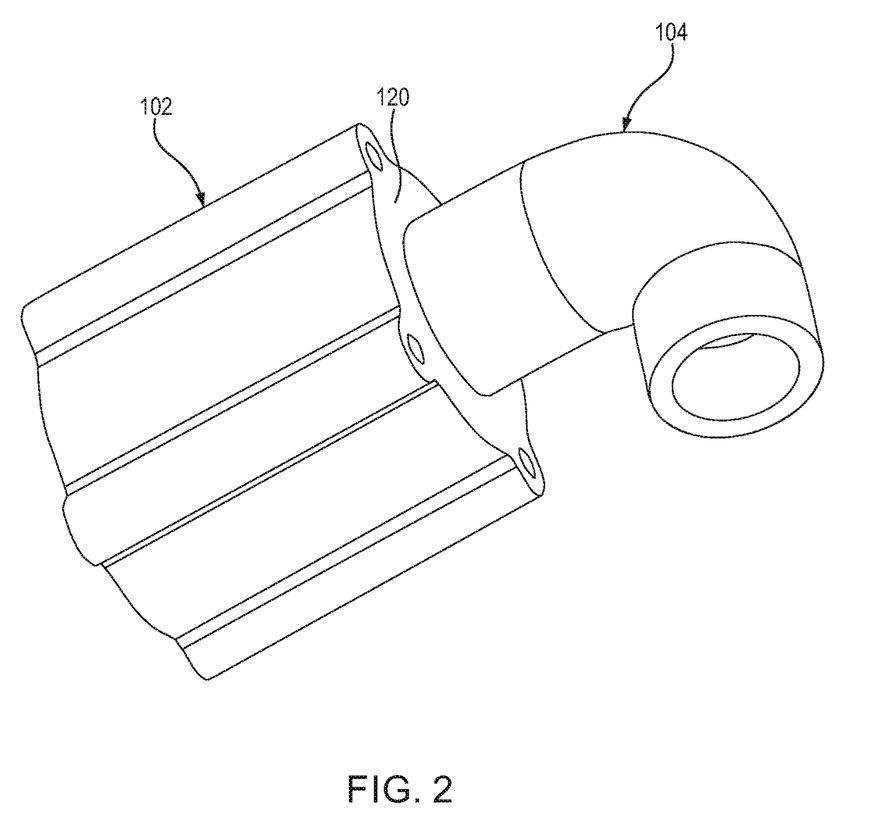
FIG. 2 illustrates a diagrammatic perspective view of an arrangement of a first elongate cavity and a second elongate cavity for the stimulating mechanism of FIG. 1, in accordance with the first embodiment of the present disclosure.
Figure 3:
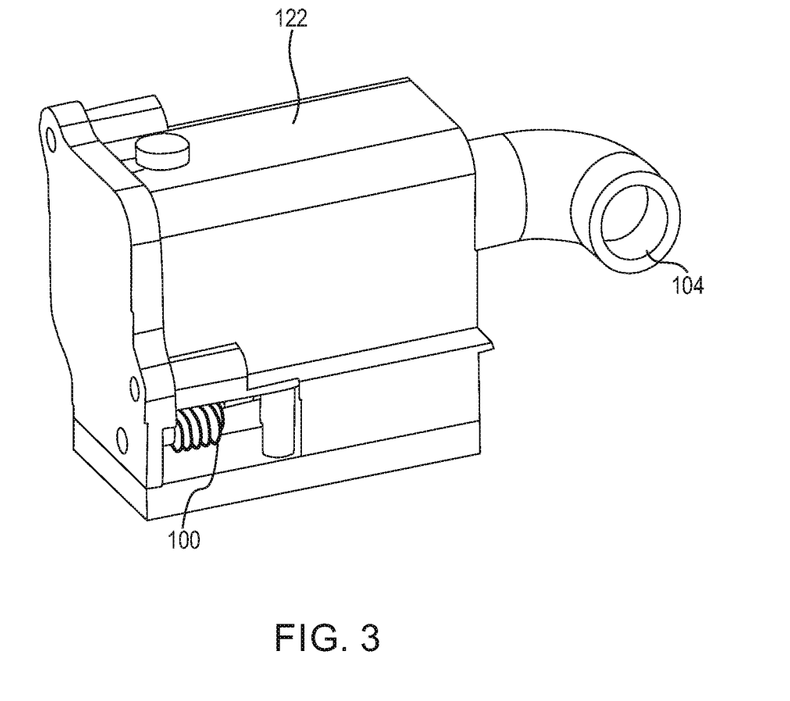
FIG. 3 illustrates a diagrammatic perspective view of a housing supporting the various components of the stimulating mechanism of FIG. 1, in accordance with the first embodiment of the present disclosure.
Figure 4:
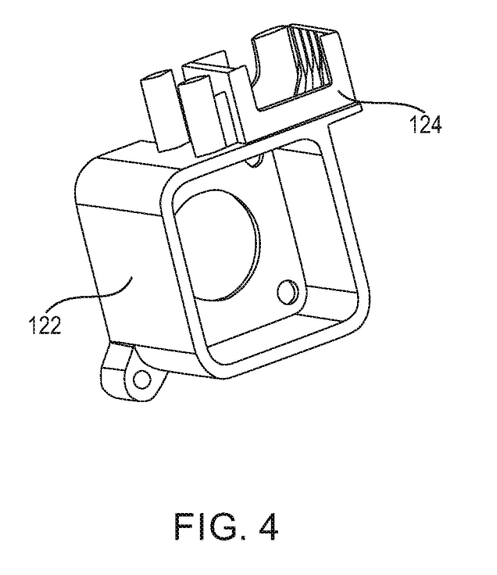
FIG. 4 illustrates a diagrammatic perspective view of the housing of FIG. 3 with a bracket for a motor of the stimulating mechanism of FIG. 1 supported thereon, in accordance with the first embodiment of the present disclosure.

FIG. 2 illustrates a diagrammatic perspective view of an arrangement of the first elongate cavity 102 and the second elongate cavity for the stimulating mechanism 100, according to the first embodiment of the present disclosure. In the present first embodiment, the stimulating mechanism 100 includes a shell 120. The shell 120 generally covers or surrounds the first elongate cavity 102. Preferably, as illustrated, the shell 120 defines (or forms) the first elongate cavity 102. That is, the shell 120 may have a cylindrical hole extending along length therein, to define the first elongate cavity 102. In some examples, the shell 120 may extend up to and also define the second elongate cavity 104 without any limitations. Further, FIG. 3 illustrates a diagrammatic perspective view of a housing 122 supporting the various described components of the stimulating mechanism 100; and FIG. 4 illustrates a diagrammatic perspective view of the housing 122 with a bracket 124 (shown in FIG. 4) for supporting the motor 110 of the stimulating mechanism 100. In particular, the housing 122 supports the bracket 124 thereon. In the present examples, the housing 122 (including the shell 120 and the bracket 124, or not) may be made of any suitable material, such as, but not limited to, plastic, metal alloys, wood or any biocompatible material, and the like. It may be appreciated that the stimulating mechanism 100 with the housing 122 generally represent or may be used as the entire of the adult toy.

As may be understood from the description of the stimulating mechanism 100 of the first embodiment, the functionality of motor 110 therein is to change the direction of the second magnet 108 (rotatable permanent magnet). The purpose of changing the direction of the second magnet 108 is to recurrently switch the magnetic pole thereof. In the described second embodiment in the proceeding paragraphs, the second magnet is made as an electromagnet and the magnetic poles thereof can be changed by changing the direction of electric current passing through the electromagnetic coil; thereby achieving the same function without rotating the electromagnet itself.

Figure 5A:
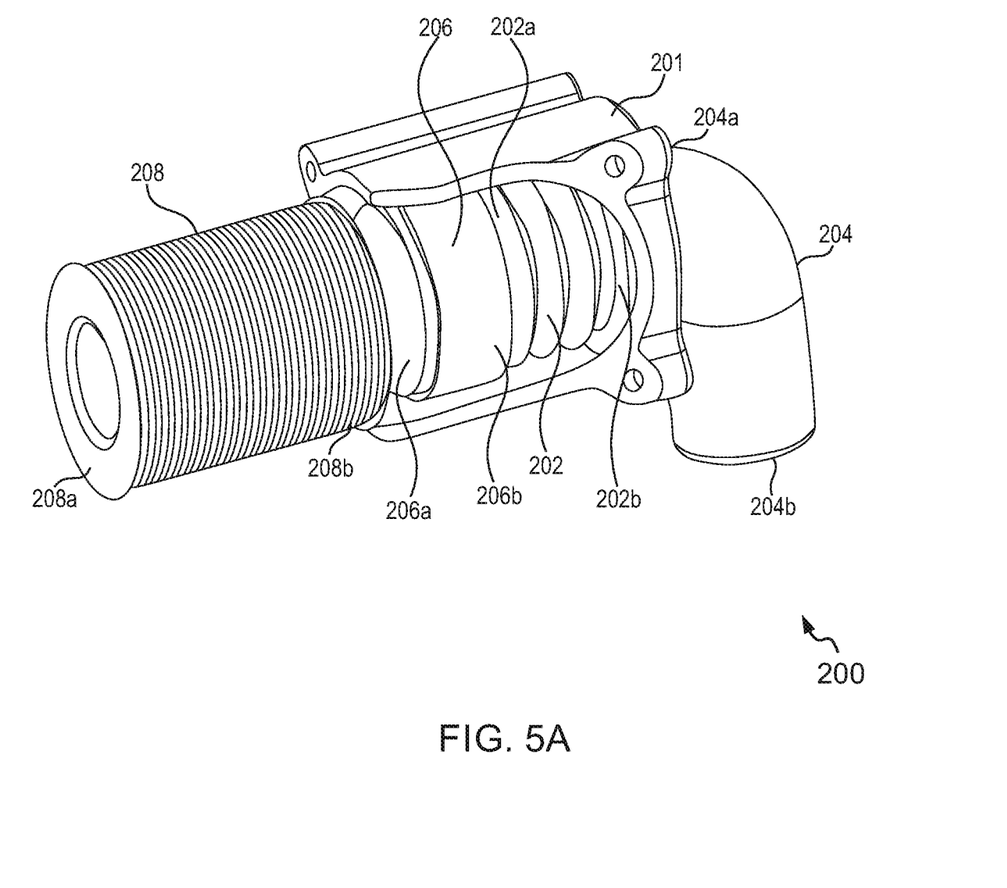
FIG. 5A illustrates a diagrammatic perspective view of a stimulating mechanism for the adult toy with a section removed to show internal structure thereof and showing a first elongated cavity thereof in an inspiratory state thereof, in accordance with a second embodiment of the present disclosure.
Figure 5B:
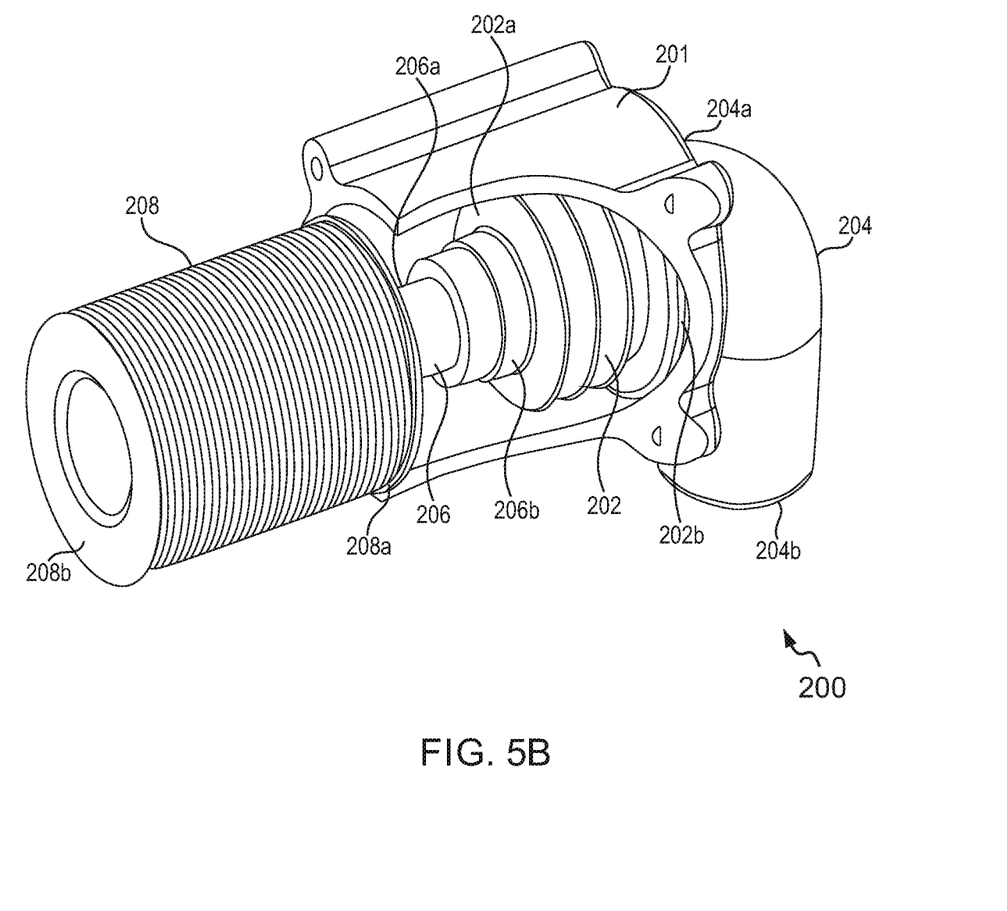
FIG. 5B illustrates a diagrammatic perspective view of the stimulating mechanism of FIG. 5A for the adult toy with the first elongated cavity thereof shown in an expiratory state thereof, in accordance with the second embodiment of the present disclosure.

FIGS. 5A-5B illustrate diagrammatic perspective views of a stimulating mechanism 200 for the adult toy with a section of a housing 201 removed to show internal structure thereof, in accordance with a second embodiment of the present disclosure. Similar to the stimulating mechanism 100, the stimulating mechanism 200 includes a first elongated cavity 202 (like the first elongated cavity 102) having a first end 202a and a second end 202b; and a second elongate cavity 204 having a first end 204a and a second end 204b. Also, the first end 204a of the second elongate cavity 204 is coupled to the second end 202b of the first elongate cavity 202 to be disposed in fluid communication therewith, and the second end 204b of the second elongate cavity 204 is open-ended. In particular, as may be seen, FIG. 5A shows the first elongated cavity 202 in an inspiratory state thereof and FIG. 5B shows the first elongated cavity 202 in an expiratory state thereof.

As illustrated in FIGS. 5A-5B, the stimulating mechanism 200 includes a first magnet 206 being a permanent magnet and having a north pole side 206a and a south pole side 206b. The first magnet 206 is arranged inside the first elongate cavity 202 to linearly translate between the first end 202a and the second end 202b thereof. Further, the stimulating mechanism 200 includes a second magnet 208 being an electromagnet and having a north pole side 208a and a south pole side 208b. The second magnet 208 is arranged with respect to the first magnet 206 to face one of the north pole side 206a and the south pole side 206b of the first magnet 206 (in the illustrated example, the north pole side 206a). Herein, the second magnet 208 being an electromagnet may include electric coil (as shown) wound on an iron core through which an electric current is supplied to impart the magnetic properties thereto. For this purpose, the stimulating mechanism 200 includes an electrical line (not shown) configured to supply electric current to the second magnet 208. The electrical line may draw electric current from a power source, such as a battery or a main power supply.

In the present second embodiment, the stimulating mechanism 200 further includes an electric supply controller (not shown) configured to recurrently reverse direction of the supply of the electric current to the second magnet 208 to cause switching of the north pole side 208a and the south pole side 208b therein (as well known in the art), and thereby recurrently change the magnetic orientation of the second magnet 208 (as shown via switching of magnetic poles 208a and 208b between FIGS. 5A and 5B) with respect to the first magnet 206, causing the first magnet 206 to linearly translate inside the first elongate cavity 202. In some examples of the second embodiment, the electric supply controller is further configured to regulate a rate of reversal of direction of the supply of the electric current to the second magnet 208 to correspondingly vary a rate of linearly translation of the first magnet 206 inside the first elongate cavity 202. Such functioning of the electric supply controller may be contemplated by a person skilled in the art, and thus has not been described herein for the brevity of the present disclosure.

As also discussed in reference to the stimulating mechanism 200, in the stimulating mechanism 200, as the first magnet 206 may move inside the first elongate cavity 202 from the first end 202a to the second end 202b, it compresses the air present in the first elongated cavity 202. Since the first elongated cavity 202 (air compression cavity) and the second elongated cavity 204 (breath cavity) are communicant with each other, this results in the compressed air from the first elongated cavity 202 to move to the second elongated cavity 204. The result is the second elongated cavity 204 being in the expiratory state. Further, as the first magnet 206 may move inside the first elongate cavity 202 from the second end 202b to the first end 202a, it creates a vacuum inside the first elongate cavity 202. Since the first elongated cavity 202 and the second elongated cavity 204 are communicant with each other, this result in moving (sucking) of the air from the second elongated cavity 204 to the first elongated cavity 202. The result is the second elongated cavity 204 being in the inspiratory state. In one or more examples, the second elongated cavity 204 may be in the form of a bellow which may get compressed by movement of the first magnet 206 to compress the air therein, without departing from the scope and spirit of the present disclosure.

Figure 6:
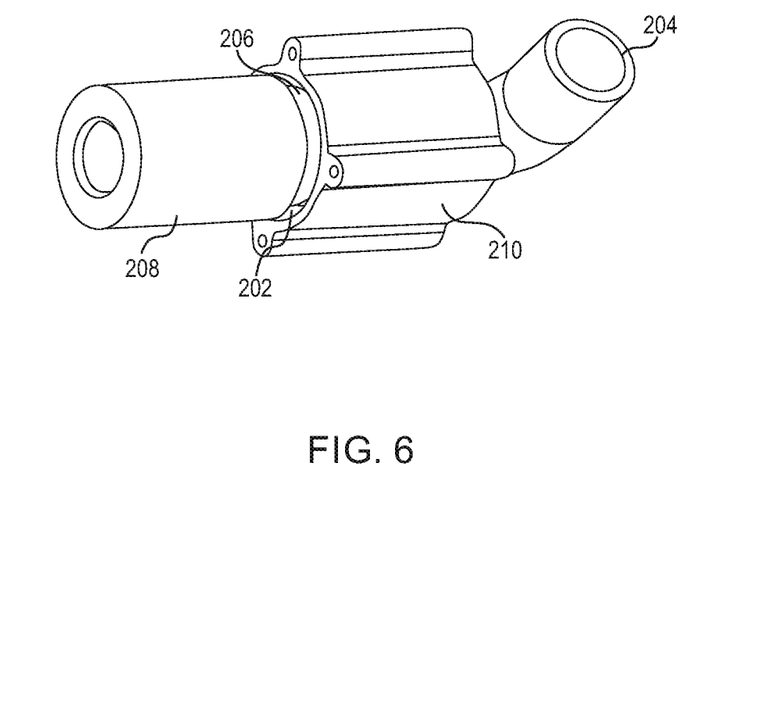
FIG. 6 illustrates a diagrammatic perspective view of an arrangement of a first elongate cavity and a second elongate cavity along with a first magnet for the stimulating mechanism of FIGS. 5A and 5B, in accordance with the second embodiment of the present disclosure.
Figure 7:
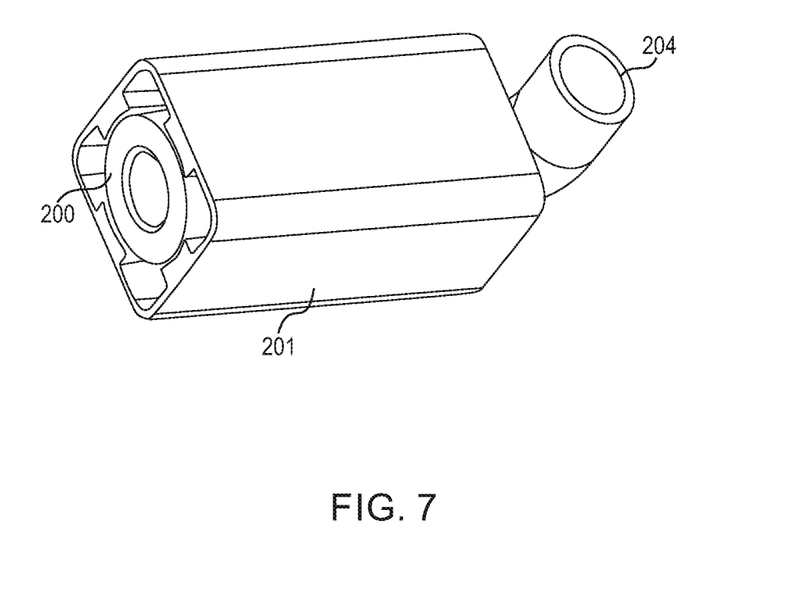
FIG. 7 illustrates a diagrammatic perspective view of a housing for the stimulating mechanism of FIGS. 5A and 5B supporting the various components thereof, in accordance with the second embodiment of the present disclosure.

FIG. 6 illustrates a diagrammatic perspective view of an arrangement of the first elongate cavity 202 and the second elongate cavity 204 for the stimulating mechanism 200. As shown, the stimulating mechanism 200 includes a shell 210 which defines the first elongate cavity 202 therein. FIG. 7 illustrates a diagrammatic perspective view of the housing 201 to be implemented with the stimulating mechanism 200. As shown, the housing 201 generally covers and surrounds the various components of the stimulating mechanism 200 including the first magnet 208, the shell 210; however, the second elongated cavity 204 is extending outwards therefrom, such that the second end 204b of the second elongated cavity 204 is open-ended. In the present examples, the housing 201 (including the shell 210) may be made of any suitable material, such as, but not limited to, plastic, metal alloys, wood or any biocompatible material, and the like. It may be appreciated that the stimulating mechanism 200 with the housing 210 generally represent or may be used as the entire of the adult toy.

For purposes of the present disclosure, the controller (including the motor controller and the electric supply controller) may be any processing device, system or part thereof that controls at least one operation of the adult toy. The controller may be implemented in hardware, firmware or software, or some combination of at least two of the same. It should be noted that the functionality associated with any particular controller may be centralized or distributed, whether locally or remotely. The controller may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. Further, the memory may include one or more non-transitory computer-readable storage media that can be read or accessed by other components in the device. The memory may be any computer-readable storage media, including volatile and/or non-volatile storage components, such as optical, magnetic, organic or other memory or disc storage, which can be integrated in whole or in part with the device. In some examples, the memory may be implemented using a single physical device (e.g., one optical, magnetic, organic or other memory or disc storage unit), while in other embodiments, the memory may be implemented using two or more physical devices.

The stimulating mechanism 100; 200 of the present disclosure is implemented in an adult toy to provide sucking stimuli to a user, for example, to recreate on the male sexual organ an effect similar to the fellatio. For this purpose, the user may place the second end 104b; 204b of the second elongated cavity 104; 204 on the desired genital and experience sucking action with the disposition of the second elongated cavity 104; 204 between the expiratory state and the inspiratory state thereof. In present examples, the adult toy can include any number of adult entertainment devices. As discussed, the adult toy could comprise a vibrator, dildo, massager, or similar device. In general, the adult toy should have at least one operative functionality that can be altered, herein the sucking function, for providing sucking simulation. In some examples, the movement of the first magnet 106; 206 can also be utilized for providing an extending function or the like for the adult toy, for providing penetration simulation. The operation of the functionality of the adult toy can be altered either manually using, e.g., control dial or the like, or remotely using receiver without any limitations.

The benefits and advantages described above may relate to one embodiment or may relate to several embodiments. The embodiments are not limited to those that solve any or all of the stated problems or those that have any or all of the stated benefits and advantages.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A stimulating mechanism for an adult toy, comprising:
   a first elongate cavity having a first end and a second end;
   a first magnet having a north pole side and a south pole side, the first magnet arranged inside the first elongate cavity to linearly translate between the first end and the second end thereof; and
   a second magnet having a north pole side and a south pole side, the second magnet arranged with respect to the first magnet to face one of the north pole side and the south pole side of the first magnet,
   wherein the second magnet is caused to recurrently change the magnetic orientation with respect to the first magnet such that the north pole side and the south pole side of the second magnet are alternatively facing one of the north pole side and the south pole side of the first magnet, causing the first magnet to linearly translate inside the first elongate cavity.

2. The stimulating mechanism as claimed in claim 1 further comprising a second elongate cavity having a first end and a second end, the first end of the second elongate cavity is coupled to the second end of the first elongate cavity to be disposed in fluid communication therewith, and the second end of the second elongate cavity being open-ended such that the second elongate cavity is disposed in an expiratory state when the first magnet linearly translates to move from the first end to the second end inside of the first elongate cavity and the second elongate cavity is disposed in an inspiratory state when the first magnet linearly translates to move from the second end to the first end inside of the first elongate cavity.

3. The stimulating mechanism as claimed in claim 1, wherein the first magnet and the second magnet are permanent magnets.

4. The stimulating mechanism as claimed in claim 3 further comprising a motor coupled to the second magnet via a gear arrangement, wherein the motor, via the gear arrangement, is configured to rotate the second magnet to recurrently change the magnetic orientation thereof with respect to the first magnet.

5. The stimulating mechanism as claimed in claim 4, wherein the gear arrangement comprises:
   a shaft, with screw threads, rotatably coupled to the motor; and
   a gear wheel with teeth engaged with the screw threads of the shaft, and having a rotating element fixed and extending along central axis thereof to which the second magnet is mounted.

6. The stimulating mechanism as claimed in claim 4 further comprising a motor controller configured to regulate a rate of rotation of the motor, and thereby a rate of rotation of the second magnet, to correspondingly vary a rate of linear translation of the first magnet inside the first elongate cavity.

7. The stimulating mechanism as claimed in claim 3 further comprising:
   a bracket to support the motor therein; and
   a shell defining at least the first elongate cavity.

8. The stimulating mechanism as claimed in claim 7 further comprising a housing adapted to cover, at least, the bracket and the shell therein.

9. The stimulating mechanism as claimed in claim 1, wherein the first magnet is a permanent magnet and the second magnet is an electromagnet.

10. The stimulating mechanism as claimed in claim 9 further comprising:
   an electrical line configured to supply electric current to the second magnet; and
   an electric supply controller configured to recurrently reverse direction of the supply of the electric current to the second magnet to cause switching of the north pole side and the south pole side therein, and thereby recurrently change the magnetic orientation of the second magnet with respect to the first magnet.

11. A stimulating mechanism for an adult toy, comprising:
   a first elongate cavity having a first end and a second end;
   a first magnet being a permanent magnet and having a north pole side and a south pole side, the first magnet arranged inside the first elongate cavity to linearly translate between the first end and the second end thereof;
   a second magnet being a permanent magnet and having a north pole side and a south pole side, the second magnet arranged with respect to the first magnet to face one of the north pole side and the south pole side thereof; and
   a motor coupled to the second magnet via a gear arrangement, wherein the motor, via the gear arrangement, is configured to rotate the second magnet to recurrently change the magnetic orientation thereof with respect to the first magnet such that the north pole side and the south pole side of the second magnet are alternatively facing one of the north pole side and the south pole side of the first magnet, causing the first magnet to linearly translate inside the first elongate cavity.

12. The stimulating mechanism as claimed in claim 11 further comprising a second elongate cavity having a first end and a second end, the first end of the second elongate cavity is coupled to the second end of the first elongate cavity to be disposed in fluid communication therewith, and the second end of the second elongate cavity being open-ended, such that the second elongate cavity is disposed in an expiratory state when the first magnet linearly translates to move from the first end to the second end inside of the first elongate cavity and the second elongate cavity is disposed in an inspiratory state when the first magnet linearly translates to move from the second end to the first end inside of the first elongate cavity.

13. The stimulating mechanism as claimed in claim 11, wherein the gear arrangement comprises a shaft, with screw threads, rotatably coupled to the motor, and a gear wheel with teeth engaged with the screw threads of the shaft, and having a rotating element fixed and extending along central axis thereof to which the second magnet is mounted.

14. The stimulating mechanism as claimed in claim 11 further comprising a motor controller configured to regulate a rate of rotation of the motor, and thereby a rate of rotation of the second magnet, to correspondingly vary a rate of linearly translation of the first magnet inside the first elongate cavity.

15. The stimulating mechanism as claimed in claim 11 further comprising:
   a bracket to support the motor therein; and
   a shell defining at least the first elongate cavity.

16. The stimulating mechanism as claimed in claim 15 further comprising a housing adapted to cover, at least, the bracket and the shell therein.

17. A stimulating mechanism for an adult toy, comprising:
   a first elongate cavity having a first end and a second end;
   a first magnet being a permanent magnet and having a north pole side and a south pole side, the first magnet arranged inside the first elongate cavity to linearly translate between the first end and the second end thereof;
   a second magnet being an electromagnet and having a north pole side and a south pole side, the second magnet arranged with respect to the first magnet to face one of the north pole side and the south pole side thereof;
   an electrical line configured to supply electric current to the second magnet; and
   an electric supply controller configured to recurrently reverse direction of the supply of the electric current to the second magnet to cause switching of the north pole side and the south pole side therein, and thereby recurrently change the magnetic orientation of the second magnet with respect to the first magnet, causing the first magnet to linearly translate inside the first elongate cavity.

18. The stimulating mechanism as claimed in claim 17 further comprising a second elongate cavity having a first end and a second end, the first end of the second elongate cavity is coupled to the second end of the first elongate cavity to be disposed in fluid communication therewith, and the second end of the second elongate cavity being open-ended, such that the second elongate cavity is disposed in an expiratory state when the first magnet linearly translates to move from the first end to the second end inside of the first elongate cavity and the second elongate cavity is disposed in an inspiratory state when the first magnet linearly translates to move from the second end to the first end inside of the first elongate cavity.

19. The stimulating mechanism as claimed in claim 17, wherein the electric supply controller is further configured to regulate a rate of reversal of direction of the supply of the electric current to the second magnet to correspondingly vary a rate of linearly translation of the first magnet inside the first elongate cavity.

20. The stimulating mechanism as claimed in claim 17 further comprising a shell defining at least the first elongate cavity therein, and a housing adapted to cover the shell.

* * * * *